(12) United States Patent
Cho

(10) Patent No.: US 11,799,284 B2
(45) Date of Patent: Oct. 24, 2023

(54) APPARATUS FOR CONTROLLING TEMPERATURE OF COMPONENT OF POWER SOURCE SEPARATION CIRCUIT

(71) Applicant: LG ELECTRONICS INC., Seoul (KR)

(72) Inventor: Bong Jin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/286,150

(22) PCT Filed: Oct. 11, 2019

(86) PCT No.: PCT/KR2019/013370
§ 371 (c)(1),
(2) Date: Apr. 16, 2021

(87) PCT Pub. No.: WO2020/080755
PCT Pub. Date: Apr. 23, 2020

(65) Prior Publication Data
US 2021/0359506 A1 Nov. 18, 2021

(30) Foreign Application Priority Data

Oct. 19, 2018 (KR) .......................... 10-2018-0125503

(51) Int. Cl.
*H02H 5/04* (2006.01)
*H02H 1/00* (2006.01)
(52) U.S. Cl.
CPC .......... *H02H 5/047* (2013.01); *H02H 1/0007* (2013.01)

(58) Field of Classification Search
CPC .......... H02H 5/04; H02H 5/042; H02H 5/047; H02H 1/0007
See application file for complete search history.

(56) References Cited

U.S. PATENT DOCUMENTS

| | | | | | |
|---|---|---|---|---|---|
| 5,408,073 | A | * | 4/1995 | Jeong ................. | H05B 6/1263 219/494 |
| 5,637,248 | A | * | 6/1997 | Park ........................ | H05B 6/06 219/508 |

(Continued)

FOREIGN PATENT DOCUMENTS

| JP | 5119890 B2 | 1/2013 |
|---|---|---|
| KR | 10-1998-0038175 | 9/1998 |

(Continued)

OTHER PUBLICATIONS

JP 2017-229472. Nov. 29, 2017. (Year: 2017).*

(Continued)

*Primary Examiner* — Jared Fureman
*Assistant Examiner* — Christopher J Clark
(74) *Attorney, Agent, or Firm* — KED & ASSOCIATES, LLP

(57) ABSTRACT

The present disclosure is directed to an apparatus for controlling temperature of component of power source separation circuit in which a temperature detection circuit may be implemented in a circuit that uses a power source different from a power source used by the control microcomputer, may directly measure a temperature of a circuit component, and may deliver a protective signal to the control microcomputer using a comparator and an insulating phototransistor, thereby implementing a protective operation.

16 Claims, 2 Drawing Sheets

(56) References Cited

U.S. PATENT DOCUMENTS

| | | | |
|---|---|---|---|
| 2014/0078633 A1 | 3/2014 | Zhou | |
| 2017/0302187 A1 | 10/2017 | Asao | |
| 2017/0365994 A1 | 12/2017 | Kikuchi | |
| 2019/0165565 A1* | 5/2019 | Suzuki | ................... H02H 7/04 |

FOREIGN PATENT DOCUMENTS

| | | |
|---|---|---|
| KR | 20-0125457 Y1 | 9/1998 |
| KR | 10-1999-0002140 | 1/1999 |
| KR | 20-2000-0014261 U | 7/2000 |
| KR | 10-2001-0030109 A | 4/2001 |
| KR | 10-2003-0075801 A | 9/2003 |

OTHER PUBLICATIONS

Hysteresis Setting for Comparator. Jan. 2018. (Year: 2018).*
International Search Report (with English Translation) and Written Opinion dated Feb. 10, 2020 issued in Application No. PCT/KR2019/013370.
Extended European Search Report dated Jun. 13, 2022 issued in Application 19872545.9.

* cited by examiner

APPARATUS FOR CONTROLLING TEMPERATURE OF COMPONENT OF POWER SOURCE SEPARATION CIRCUIT

CROSS-REFERENCE TO RELATED PATENT APPLICATIONS

This application is a U.S. National Stage Application under 35 U.S.C. § 371 of PCT Application No. PCT/KR2019/013370, filed Oct. 11, 2019, which claims priority to Korean Patent Application No. 10-2018-0125503, filed Oct. 19, 2018, whose entire disclosures are hereby incorporated by reference.

TECHNICAL FIELD

Disclosed herein is an apparatus for controlling a temperature of a component of a power source separation circuit using a hysteresis characteristic of a comparator.

BACKGROUND ART

As integrated circuits are highly integrated and have multi functions, a digital and analogue circuit block and a memory block and the like are built into a single chip. In the case of a multi-functional circuit built into a single chip, a power source is separated for each block to minimize an effect on each block.

As a related art, an apparatus and method for controlling temperature around a microcomputer of a microwave oven is disclosed in Korean Patent Publication No. 10-1998-038175. In the related art, an operational error of the microcomputer, caused due to an increase in temperature around the microcomputer, can be prevented, and as a result, damage to a product, casualty and a fire can be prevented.

Additionally, as a related art, an over voltage/over temperature preventing power supplier in an exchanger is disclosed in Korean Patent Publication No. 10-1999-002140. When a temperature around the exchanger is excessively high and an over voltage is supplied into a system, a power interface circuit for cutting off power supply is provided to protect the system.

As described above, in order to detect a temperature of a circuit component with separated power source and implement a temperature protective operation using a single microcomputer, control according to the prior art is performed using an additional temperature sensor on a surface of the component or is performed depending on temperature through a circuit included in a common power supply detected by the microcomputer after indirect detection of temperature.

When an additional temperature sensor is directly assembled to a component to be measured to measure a temperature of the component, costs increase and assembability deteriorates. Additionally, when a temperature around a component is detected to indirectly predict a temperature of the component, the temperature of the component cannot be measured with accuracy.

DESCRIPTION OF INVENTION

Technical Problem

The present disclosure is directed to an apparatus for controlling temperature of component of power source separation circuit in which a temperature detection circuit may be implemented in a circuit that uses a power source different from a power source used by the control microcomputer, may directly measure a temperature of a circuit component, and may deliver a protective signal to the control microcomputer using a comparator and an insulating phototransistor, thereby implementing a protective operation.

The present disclosure is also directed to an apparatus for controlling temperature of component of power source separation circuit in which, in case that the temperature of the circuit component drops to the temperature of normal operating temperature after the protective operation of microcomputer, a normal signal may be delivered to the control microcomputer through the insulating phototransistor using a hysteresis characteristic of the comparator, thereby implementing a normal operation.

The present disclosure is also directed to a component temperature control apparatus of a power source separation circuit in which the temperature detection circuit may be implemented in a circuit that uses a power source different from a power source used by the control microcomputer, thereby preventing an increase in costs and a deterioration in assembability.

Aspects according to the present disclosure are not limited to the above ones, and other aspects and advantages that are not mentioned above can be clearly understood from the following description and can be more clearly understood from the embodiments set forth herein. Additionally, the aspects and advantages of the present disclosure can be realized via means and combinations thereof that are described in the appended claims.

Technical Solution

An apparatus for controlling temperature of component of power source separation circuit according to the present disclosure may include a microcomputer and a temperature detector. The microcomputer is configured to control a temperature protective operation of one or more circuit components that use a power source different from a power source used by the microcomputer based on a detected temperature of the one or more circuit components. The temperature detector is implemented directly in a circuit that uses the power source different from a power source used by the microcomputer, and is configured to detect a temperature of the one or more circuit components. Additionally, an insulating switch may be configured to deliver an insulation signal to the microcomputer in case that the temperature detected by the temperature detector exceeds a control temperature to implement a protective operation. Therefore, the protection operation can be implemented.

In this case, the temperature detector may compare the temperature of the circuit component with a reference voltage by using a comparator. The measured voltage is measured by the temperature measurement unit, and the reference voltage is generated by the reference voltage generator. The reference voltage corresponds to a normal operation state of the circuit component.

In this case, the temperature detector may include a hysteresis setting unit. The hysteresis setting unit is provided between the comparator and the insulating switch. In the normal operation and the protective operation, the hysteresis setting unit may use a hysteresis characteristic of the comparator to input a voltage corresponding to the temperature difference for the protection operation and restoration of the normal operation to the (+) terminal of the comparator. In case that the temperature of the circuit component drops to the temperature of normal operating temperature after the protective operation of the microcomputer, the hysteresis setting unit may uses the hysteresis characteristic of the comparator to implement the normal operation of the circuit component.

The temperature measurement unit may include a resistor R3 and a temperature sensor. The resistor R3 and the temperature sensor are connected to a (−) terminal of the comparator. The resistor R3 and the temperature sensor are connected in parallel between a second power source and a second ground. The second power source and the second ground are different from a power source and a ground of the microcomputer. The temperature detection circuit may be implemented in a circuit that uses a power source different from a power source used by the control microcomputer, thereby preventing an increase in costs and a deterioration in assembability.

The reference voltage generator may include a resistor R1 and a resistor R2. The resistor R1 and the resistor R2 are connected to a (+) terminal of the comparator. The resistor R1 and the resistor R2 are connected in parallel between a second power source and a second ground. The second power source and the second ground are different from a power source and a ground of the microcomputer.

In case that a sensing value of a temperature of the circuit component input to a (−) terminal is less than a reference voltage input to a (+) terminal, an output terminal of the comparator outputs a high-level signal, in case that the sensing value of a temperature of the circuit component input to the (−) terminal is greater than the reference voltage input to the (+) terminal, the output terminal of the comparator outputs a low-level signal. Therefore, the microcomputer controls the protective operation depending on temperature.

The hysteresis setting unit includes a fourth resistor R4 that is connected in parallel between the output terminal and the (+) terminal of the comparator. In case that the temperature of the circuit component drops to the temperature of normal operating temperature after the protective operation of microcomputer, a normal signal may be delivered to the control microcomputer through the insulating phototransistor using a hysteresis characteristic of the comparator, thereby implementing a normal operation.

The insulating switch may be configured as an insulating phototransistor (Photo TR) including a photodiode as a light emitting element and a transistor and generate an insulation signal to the microcomputer to implement a protective operation of a corresponding circuit component.

An apparatus for controlling temperature of component of power source separation circuit according to the present disclosure may include a first resistor R1, a second resistor R2, a resistor R3, a resistor R4, a temperature sensor, a comparator and an insulating phototransistor (Photo TR). The comparator is configured to compare a sensing value of a temperature of a circuit component input to a (−) terminal with a reference voltage input to a (+) terminal. The resistor R3 and the temperature sensor are connected in parallel between a second power source and a second ground, and connected to the (−) terminal of a comparator, wherein the second power source and the second ground are different from a power source and a ground of the microcomputer. The first resistor R1 and the second resistor R2 are connected in parallel between the second power source and the second ground, and connected to the (+) terminal of the comparator. The fourth resistor R4 is connected in parallel between an output terminal and the (+) terminal of the comparator. The insulating phototransistor (Photo TR) comprises a photodiode as a light emitting element and a transistor and configured to deliver an output signal of the comparator as an insulation signal to the microcomputer. Accordingly, in case that the temperature sensed by the temperature detector exceeds the control temperature, an insulating signal is transmitted to the microcomputer through the insulating switch to implement a protection operation.

Advantageous Effect

In the apparatus for controlling temperature of component of power source separation circuit according to the present disclosure, a sensor may be directly configured in a circuit to directly measure a temperature of a circuit component, and a signal may be delivered to a control microcomputer to allow a product to reliably operate depending on a temperature of a component.

In the apparatus for controlling temperature of component of power source separation circuit according to the present disclosure, in case that the temperature of the circuit component drops to the temperature of normal operating temperature after the protective operation of microcomputer, a normal signal may be delivered to the control microcomputer using a hysteresis characteristic of the comparator, thereby ensuring accuracy in measurement of a temperature of a component depending on circumstances.

In the apparatus for controlling temperature of component of power source separation circuit according to the present disclosure, a temperature detection circuit may be designed to be directly disposed in a circuit that uses that uses a power source different from a power source used by the control microcomputer. Therefore, no separate temperature sensor is installed in the circuit. Accordingly, the unit cost of the circuit is reduced, and the workability of the user can be improved.

Specific effects are described along with the above-described effects in the section of Detailed Description.

BRIEF DESCRIPTION OF DRAWING

The accompanying drawings constitute a part of the specification, illustrate one or more embodiments in the disclosure, and together with the specification, explain the disclosure, wherein.

DETAILED DESCRIPTION OF EXEMPLARY EMBODIMENT

Figure 1:
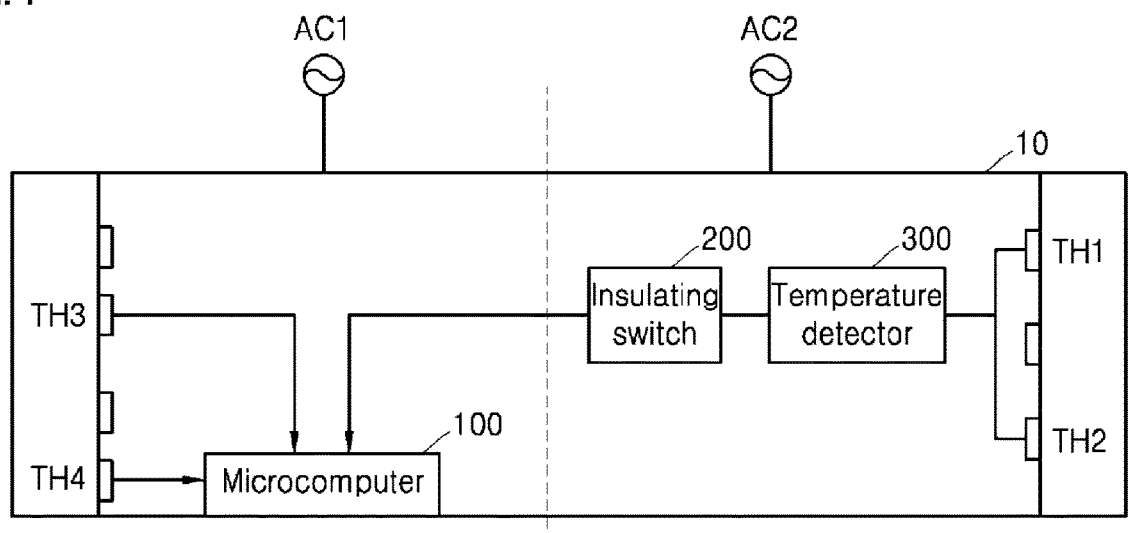
FIG. 1 is a block diagram showing an entire system having an apparatus for controlling temperature of component of power source separation circuit according to an embodiment.

The above-described objectives, features and advantages are specifically described with reference to the accompanying drawings hereunder such that one having ordinary skill in the art to which the present disclosure pertains can easily implement the technical spirit of the disclosure. In describing the disclosure, detailed description of known technologies in relation to the disclosure is omitted if it is deemed to make the gist of the present disclosure unnecessarily vague. Below, preferred embodiments of the present disclosure are specifically described with reference to the accompanying drawings. Throughout the drawings, identical reference numerals denote identical or similar components.

When one component is described as being "connected", "coupled", or "connected" to another component, one component can be directly connected, coupled or connected to another component. However, it is also to be understood that an additional component can be "interposed" between the two components, or the two components can be "connected", "coupled", or "connected" through an additional component.

Below, an apparatus for controlling temperature of component of power source separation circuit according to several embodiments is described.

FIG. 1 is a block diagram showing an entire system having an apparatus for controlling temperature of component of power source separation circuit according to an embodiment.

As illustrated in FIG. 1, the entire system includes a single chip 10, a first power source AC1 and a second power source AC2. The single chip 10 includes a single microcomputer 100, an insulating switch 200, a temperature detector 300 and a plurality of circuit components TH1~TH4. The single microcomputer 100 is included in a control device. Additionally, an insulating switch 200 and a temperature detector 300 may be provided between the microcomputer 100 and first and second circuit components TH1, TH2. The first and second circuit components TH1, TH2 use a power source different from the microcomputer 100. The insulating switch 200 may detect temperatures of the first and second circuit components TH1, TH2 and transmit it to the microcomputer 100.

That is, when a circuit having various functions is built into a single chip, a power source is separated based on each block to minimize an effect on each block. Accordingly, the first power source AC1 may be used for the microcomputer 100, the third circuit component TH3 and the fourth circuit component TH4, and the second power source AC2 may be used for the first circuit component TH1 and the second circuit component TH2.

Since the third and fourth circuit components TH3, TH4, and the microcomputer 100 use the same power source (i.e., the first power source AC1) and same ground (i.e., a first ground), the microcomputer 100 may immediately read sensing values of the third and fourth circuit components TH3, TH4.

However, the first and second circuit components TH1, TH2 use the second power source AC2 and a second ground different from the first power source AC1 and the first ground. Therefore, power short occurs in the first and second circuit components TH1, TH2 when the microcomputer 100 immediately reads a sensing value of the first and second circuit components TH1, TH2, thereby the system is damaged. To prevent this from happening, a temperature detector 300 for detecting a temperature of the first and second circuit components TH1, TH2, and an insulating switch 200 for delivering a sensing value detected by the temperature detector 300 to the microcomputer 100 as an insulation signal may be provided between the microcomputer 100 and the first and second circuit components TH1, TH2. In this case, the number of the temperature detector 300 and the insulating switch 200 may correspond to the number of the circuit components.

Figure 2:
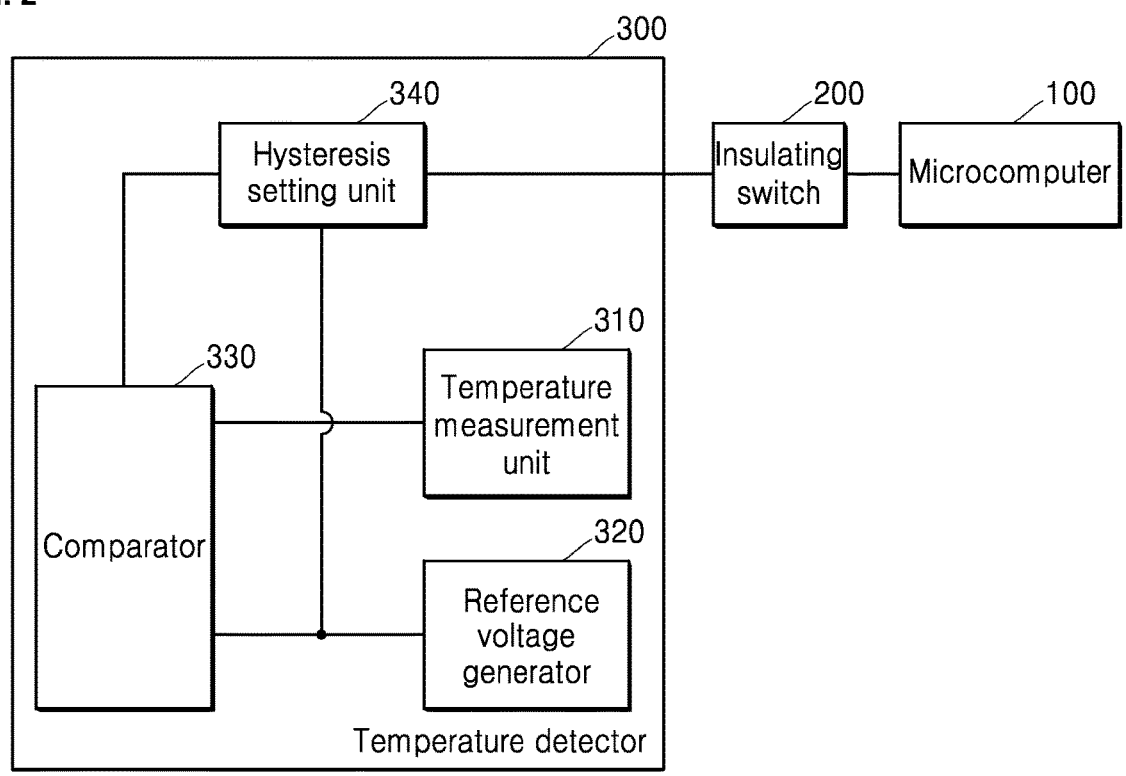
FIG. 2 is a block diagram specifically showing a configuration of the temperature detector in FIG. 1.

FIG. 2 is a block diagram specifically showing a configuration of the temperature detector in FIG. 1. For convenience of description, in FIG. 2, a single circuit component uses a power source different from the microcomputer 100. However, the single circuit component is provided only as an example. When a plurality of circuit components uses the power source different from the microcomputer 100, a plurality of temperature detectors may be provided to correspond to the plurality of circuit components.

The temperature detector 300, as illustrated in FIG. 2, may include a temperature measurement unit (i.e., temperature measurement circuit) 310 configured to measure a temperature of a circuit component that uses a power source different from the microcomputer 100, a reference voltage generator 320 configured to generate a reference voltage corresponding to a temperature at which a normal operation of the circuit component is possible, and a comparator 330 configured to compare a measured voltage correspond to the temperature of the circuit component with the reference voltage. The measured voltage is measured by the temperature measurement unit 310, and the reference voltage is generated by the reference voltage generator 320.

In this case, in case that the measured temperature of the circuit component exceeds the reference voltage, the comparator 330 may generate a protection signal as an insulation signal and may transmit the protection signal to the microcomputer 100 using the insulating switch 200, thereby implementing a protective operation of the circuit component.

The temperature detector 300 may further include a hysteresis setting unit (i.e., a hysteresis setting circuit) 340. The hysteresis setting unit 340 is provided between the comparator 330 and the insulating switch 200. In the normal operation and the protective operation, the hysteresis setting unit 340 may use a hysteresis characteristic of the comparator 330 to input a voltage corresponding to the temperature difference for the protection operation and restoration of the normal operation to the (+) terminal of the comparator 330, thereby ensuring reliability (or stability) of the protective operation.

That is, in case that the temperature of the circuit component drops to the temperature of normal operating temperature after the protective operation, the hysteresis setting unit 340 may generate a normal signal as the insulation signal based on the hysteresis characteristic of the comparator 330 and may transmit the normal signal to the microcomputer 100 using the insulating switch 200, thereby implement the normal operation of the circuit component.

Figure 3:
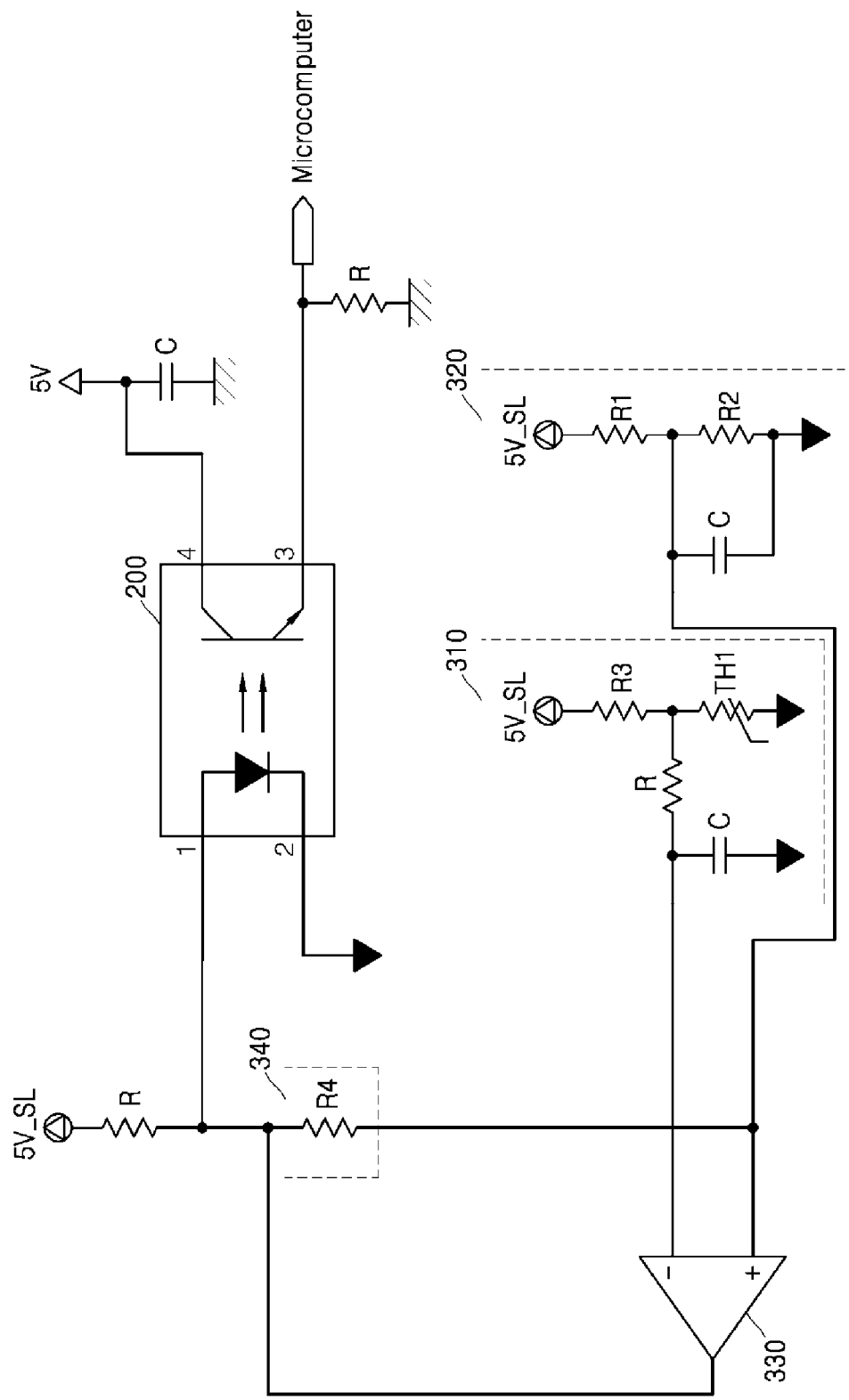
FIG. 3 shows an embodiment of a circuit diagram of each block in FIG. 2.

FIG. 3 shows an embodiment of a circuit diagram of each block in FIG. 2.

As illustrated in FIG. 3, the temperature measurement unit 310 may include a resistor R3 and a temperature sensor (shown as the TH1). The resistor R3 and the temperature sensor (shown as the TH1) are connected to a (−) terminal of the comparator 330. The resistor R3 and the temperature sensor (shown as the TH1) are connected in series between a second power source and a second ground. The second power source and the second ground are different from a power source and a ground of the microcomputer 100. Additionally, a parallel RC circuit may be installed between the temperature measurement unit 310 and the (−) terminal of the comparator 330 to enhance reliability of current.

The reference voltage generator 320 may include a resistor R1 and a resistor R2. The resistor R1 and the resistor R2 are connected to a (+) terminal of the comparator 330. The resistor R1 and the resistor R2 are connected in series between the second power source and the second ground.

A parallel RC circuit, as a filter noise, may be installed between the reference voltage generator 320 and the (+) terminal of the comparator 330, thereby enhancing reliability of current. Further, a parallel RC circuit may be installed between the insulating switch 200 and the microcomputer 100 to filter noise, thereby enhancing reliability of current.

In case that a voltage input to the (−) terminal of the comparator 330 is less than a voltage input to the (+) terminal of the comparator 330, an output terminal of the comparator 330 may output a high-level signal. In case that a voltage input to the (−) terminal of the comparator 330 is greater than a voltage input to the (+) terminal of the comparator 330, the output terminal of the comparator 330 may output a low-level signal.

Accordingly, in case that a voltage corresponds to a temperature of the circuit component, measured by the temperature measurement unit 310 connected to the (−) terminal, is less than a reference voltage output from the reference voltage generator 320 connected to the (+) terminal, the output terminal of the comparator 330 may output a high-level signal. And in case that a voltage corresponds to a temperature of the circuit component, measured by the temperature measurement unit 310 connected to the (−) terminal, is greater than a reference voltage output from the reference voltage generator 320 connected to the (+) terminal, the output terminal of the comparator 330 may output a low-level signal.

The hysteresis setting unit 340 may include a fourth resistor R4 that is connected between the output terminal and the (+) terminal of the comparator 330. That is, in case that the measured temperature of the circuit component is greater than the reference voltage of the reference voltage generator 320, the high-level signal is transmitted from the output terminal of the comparator 330, then the hysteresis setting unit 340 may deliver the high-level signal to the insulating switch 200.

In this case, when the high-level signal is transmitted from the output terminal of the comparator 330, the reference voltage is applied to the upper end of the fourth resistor R4 by the high level signal, 5V as the second power may connect in a pull-up manner. When the low-level signal is transmitted from the output terminal of the comparator 330, the upper end of the fourth resistor R4 may become ground, and the fourth resistor may connect to the first resistor R1 and the second resistor R2 of the reference voltage generator 320 in parallel. Composite resistor of the fourth resistor R4 connected to the first resistor R1 and the second resistor R2 in parallel may be set to a divided voltage of 5 V.

The hysteresis setting unit 340 may set a divided voltage by setting the composite resistor (a first resistor R1, a second resistor R2, and a fourth resistor R4 connected in parallel) based on the measured temperature of the circuit component. Accordingly, the hysteresis setting unit 340 changes (i.e., increases and decreases) the reference voltage of the reference voltage generator 320, thereby showing a hysteresis temperature feature. Thus, the hysteresis setting unit 340 may change a value of the fourth resistor R4 depending on a feature and a control temperature of the temperature sensor (shown as the TH1) of the temperature measurement unit 310 to set a hysteresis temperature feature desired by a user.

The insulating switch 200 may be configured as an insulating phototransistor (Photo TR) including a photodiode (as a light emitting element) and a transistor.

In case that the low-level signal is output to the output terminal of the comparator 330, the photodiode of the phototransistor may deliver the low-level signal to the microcomputer 100, in an off state. In this case, the upper end of the fourth resistor R4 may become ground, and the fourth resistor may connect to the first resistor R1 and the second resistor R2 in parallel. Due to composite resistor of the fourth resistor R4, the first resistor R1 and the second resistor R2, the divided voltage is set to 5 v. The divided voltage set may be set differently depending on a value of the first, second and fourth resistor R1, R2, R4. For example, in case that the first resistor R1 is 62 kΩ, the second resistor R2 is 5.8 kΩ, and the fourth resistor R4 is 100 kΩ, about 0.47 V may be set as a divided voltage of 5 V.

In case that a temperature of the circuit component measured by the temperature measurement unit 310 is greater than a protection temperature and an input voltage of the temperature sensor (shown as the TH1) is less than the divided voltage (0.47 V), the high-level signal may be output to the output terminal of the comparator 330, and the high-level signal is sinked to the second ground through the photodiode of the phototransistor. Accordingly, the photodiode may emit light, the insulating switch 200 may deliver the high-level signal as the an insulation signal to the microcomputer 100.

Here, when the high-level signal is transmitted from the output terminal of the comparator 330, the reference voltage is applied to the upper end of the fourth resistor R4 by the high level signal, 5V as the second power may connect in a pull-up manner. Then, the reference voltage may be changed to the divided voltage of the first resistor R1 and the second resistor R2 connected in parallel. For example, in case that the first resistor R1 is 62 kΩ and the second resistor R2 is 5.8 kΩ, the divided voltage of 5V may be changed to about 0.54 V.

As described above, in the apparatus for controlling temperature of component of power source separation circuit according to the present disclosure, the temperature measurement unit 310 may be directly configured in the circuit in the single chip 10 to directly measure a temperature of a component, and an additional signal may be delivered to the control microcomputer 100, that use the second power and second ground using the insulating switch 200 and the comparator 330, thereby allowing a product to operate reliably depending on the temperature of the component.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, effects and predictable effects based on the configurations in the disclosure are to be included within the range of the disclosure though not explicitly described in the description of the embodiments.

What is claimed is:

1. An apparatus for controlling temperature of components of a power source separation circuit, the apparatus comprising:
   a control device to be powered by a first power source used in the power source separation circuit, and configured to perform an operation for protecting a temperature of at least one circuit component to be powered by a second power source different from the first power source based on a detected temperature of the at least one circuit component;
   a temperature detector to be powered by the second power source and configured to detect the temperature of the at least one circuit component;
   a switch to be powered by the second power source and configured to provide a control signal to the control device when the temperature detected by the temperature detector exceeds a control temperature,
   wherein the temperature detector comprises:

a comparator configured to:
receive, at a first terminal, a sensed temperature value corresponding to the temperature of the at least one circuit component,
receive, at a second terminal, a reference voltage value,
compare the sensed temperature value and the reference voltage value, and
provide a temperature difference value based on the comparison, and
a hysteresis setting circuit to be powered by the second power source and provided between the comparator and the switch, wherein the hysteresis setting circuit is configured to provide a voltage value corresponding to the temperature difference value for protection operation and restoration of normal operation to the second terminal of the comparator in order for operation of the comparator to have a hysteresis characteristic, and
wherein the hysteresis setting circuit is configured to:
generate a normal signal when the temperature of the at least one circuit component drops to the normal operating temperature based on a hysteresis characteristic of the comparator after the protection operation, and
provide the generated normal signal to the switch so that the at least one circuit component operates normally,
wherein the at least one circuit component, the temperature detector, the switch and the hysteresis setting circuit receive power from the second power source, and the control device receives power from the first power source which is a different power source than the second power source.

2. The apparatus of claim 1, wherein the temperature detector further comprises:
a temperature measurement circuit to be powered by the second power source and configured to measure the temperature of the at least one circuit component, and
a reference voltage generator to be powered by the second power source and configured to provide the reference voltage value corresponding to a temperature at which a normal operation of the at least one circuit component is possible.

3. The apparatus of claim 2, wherein the temperature measurement circuit includes a third resistor and a temperature sensor connected in series between the second power source and a ground, and connected to the first terminal of the comparator.

4. The apparatus of claim 2, wherein the reference voltage generator includes a first resistor and a second resistor connected in series between the second power source and a ground, and connected to the second terminal of the comparator.

5. The apparatus of claim 2, wherein the comparator is configured to:
output, from an output terminal, a first signal when the sensed temperature input to the first terminal is less than the reference voltage value input to the second terminal, and
output, from the output terminal, a second signal, different from the first signal, when the sensed temperature value input to the first terminal is greater than the reference voltage value input to the second terminal.

6. The apparatus of claim 1, wherein the hysteresis setting circuit includes a fourth resistor that is connected between an output terminal of the comparator and the second terminal of the comparator.

7. The apparatus of claim 1, wherein the switch is configured as a phototransistor.

8. An apparatus for controlling temperature of components of a power source separation circuit having a control device to receive power from a first power source, the apparatus comprising:
a comparator having a first input terminal, a second input terminal, and an output terminal, and configured to compare a sensed temperature value, input to the first input terminal, corresponding to a temperature of a circuit component with a reference voltage value, input to the second input terminal, and configured to provide an output signal, from the output terminal, based on the comparison;
a third resistor and a temperature detector connected in series between a second power source and a ground, and connected to the first input terminal of the comparator, wherein the second power source is a different power source than the first power source;
a first resistor and a second resistor connected in series between the second power source and the ground, and connected to the second input terminal of the comparator;
a fourth resistor connected between the output terminal of the comparator and the second input terminal of the comparator;
a phototransistor configured to receive the output signal from the comparator and to provide a control signal based on the output signal; and
a hysteresis setting circuit provided between the comparator and a switch, the switch providing a control signal to the control device when the temperature detected by the temperature detector exceeds a control temperature, and
wherein the hysteresis setting circuit is configured to:
generate a normal signal when the temperature of at least one circuit component drops to the normal operating temperature based on a hysteresis characteristic of the comparator after a protection operation, and
provide the generated normal signal to the switch so that the at least one circuit component operates normally,
wherein the circuit component, the temperature detector, the switch and the hysteresis setting circuit receive power from the second power source, and the control device receives power from the first power source which is a different power source than the second power source.

9. The apparatus of claim 8, wherein the phototransistor comprises a photodiode and a transistor electrically isolated.

10. The apparatus of claim 8, wherein the control device controls operation of the at least one circuit component based on the control signal.

11. The apparatus of claim 10, wherein the control device includes a microcomputer.

12. The apparatus of claim 1, wherein the control device includes a microcomputer.

13. The apparatus of claim 1, wherein the control signal is a protection signal to provide the temperature protective operation to the at least one circuit component.

14. The apparatus of claim 1, wherein the control signal comprises the normal signal to provide normal operation to the at least one circuit component.

15. A single chip comprising:
   the at least one circuit component;
   a plurality of additional circuit components; and
   the apparatus of claim 1.

16. The single chip of claim 15, wherein a first one of the plurality of additional circuit components is to be powered by the first power source.

\* \* \* \* \*